United States Patent [19]

Wilkie

[11] 4,267,778
[45] May 19, 1981

[54] OVERHEAD CONVEYOR TRACK SYSTEM

[76] Inventor: William V. Wilkie, 2953 George La., Ludington, Mich. 49431

[21] Appl. No.: 66,087

[22] Filed: Aug. 13, 1979

[51] Int. Cl.³ ............................................... E01B 3/00
[52] U.S. Cl. ...................................................... 104/94
[58] Field of Search ............ 104/94, 89, 172 R, 172 S, 104/178, 250; 105/148, 155

[56] References Cited

U.S. PATENT DOCUMENTS 3,965,823  6/1976  Bardot .................................. 104/94
4,122,778  10/1978  DiRosa .................................. 104/94

Primary Examiner—Richard A. Bertsch
Attorney, Agent, or Firm—Harness, Dickey & Pierce

[57] ABSTRACT

An overhead trolley conveyor system has an overhead track comprising a pair of angle irons each having an inwardly extending flange and an upwardly extending flange, the angle irons being supported in spaced relationship to each other by a plurality of strap members which impart a cant to the inwardly extending flanges which are adapted to support a pair of tapered wheels associated with an axle of a trolley.

9 Claims, 10 Drawing Figures

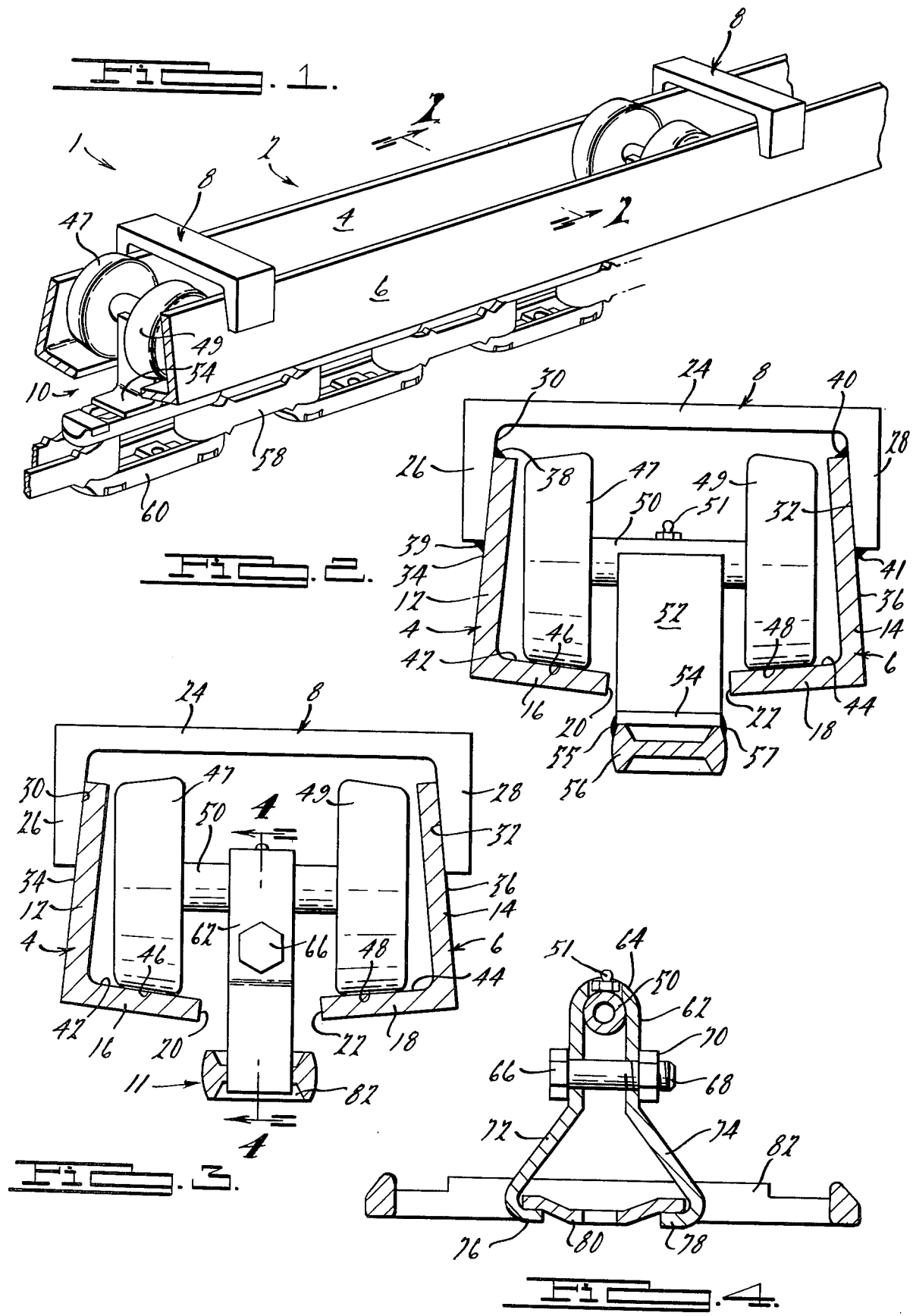

OVERHEAD CONVEYOR TRACK SYSTEM

BACKGROUND OF THE INVENTION

The present invention relates to an endless chain conveyor system for supporting and transporting parts or other loads between manufacturing operations or other processes. More particularly, the present invention relates to an overhead trolley conveyor system employing overhead guide tracks which support a plurality of trolleys joined by a powered conveyor chain which can be driven by a friction traction wheel.

The use of overhead conveyors comprising a plurality of wheeled trolleys which roll upon guide tracks and are connected by a load supporting endless chain is well known in the art. Such conveyors are often used in the manufacturing industries to transport parts through manufacturing steps such as washing, phosphating, rinsing, painting, and drying. Although overhead trolley conveyors are extensively used, they are frequently expensive to purchase and install. Such conveyor systems commonly employ trolley brackets, heavy clevis attachments and a separate grease fitting for each wheel. Also, such systems require too much headroom for certain installations and uses, commonly requiring about 12 inches of headroom. Further, overhead conveyor chains and brackets are frequently subject to catching on extraneous items which can damage, stop or derail the system. Still further, many systems are overengineered and employ unduly complex and/or heavy apparatus. In other cases, the particular design of the track system and associated trolley requires inconvenient and expensive hanging arrangements to accommodate the system and which require difficult or expensive serving.

Wherefore, it is an object of the present invention to provide an overhead conveyor system which employs readily available components and which is economical to manufacture and install. Another object of the present invention is to provide an overhead conveyor system which can be located proximate to a ceiling and requires only a minimum amount of headroom. Still another object of the present invention is to provide an overhead conveyor system which can be designed without overengineering for light, medium and heavy duty use by fabricating the system from appropriately rated parts. Yet another object of the present invention is to provide a bracket conveyor track system which is self-centering, and resistant to derailing. Still another object of the present invention is to provide an overhead conveyor system which is easily serviced. These and other objects, features, and advantages of the present invention will be readily apparent from the following disclosure and appended claims taken in conjunction with the accompanying drawings.

BRIEF DESCRIPTION OF THE DRAWINGS

FIG. 1 is a perspective view of an overhead conveyor track system of the present invention;

FIG. 2 is a sectional view taken along lines 2—2 of FIG. 1;

FIG. 3 is a sectional view similar to that of FIG. 2 showing an alternative embodiment of a hanger of the present invention;

FIG. 4 is a sectional view taken along line 4—4 of FIG. 3;

DESCRIPTION OF THE INVENTION

Figure 7:
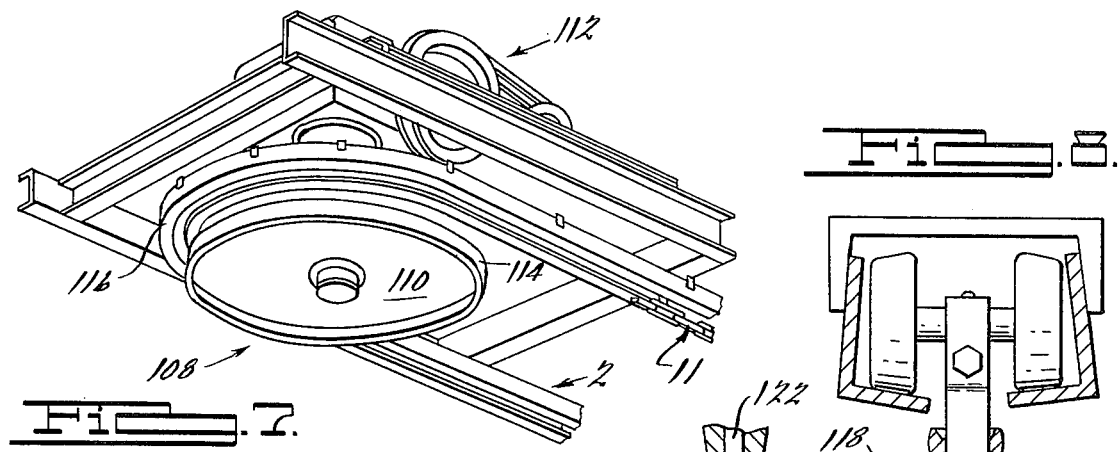
FIG. 7 is a perspective view of a traction wheel of the present invention.

In accordance with the present invention, an overhead trolley conveyor system is provided which requires only 7 inches of headroom for heavy loading and only 5 inches of headroom for normal loading. As will be further appreciated from the following disclosure, the trolleys of the system of the present invention roll on an overhead guide track comprising parallel standard angle iron rails rather than the heavy I-beam rails conventionally employed in overhead conveyor systems. Each angle iron is supported by standard channel iron brackets which have two tapered flanges which impart an angle to the angle iron rails so that a centering force is imparted to a pair of conventional tapered trolley wheels rolling on the parallel angle iron rails and positioned on opposite ends of a single axle. The structural arrangement of the present invention allows use of a single grease fitting for feeding grease through the axle to each pair of trolley wheels rather than a separate grease fitting for each wheel as is conventionally employed. Also, use of heavy, bulky outrigger brackets of trolleys associated with I-beam tracks are avoided by the present invention.

The structure of the present invention further allows the power chain or cable as well as the load carried by the conveyor to be centered directly below the center of the trolley axle. This enhances the self-centering feature of the present invention and helps to hold the power chain or cable on center to prevent side pull binding. Another advantage of the present invention is that the chain can be replaced with a larger or smaller chain or to any suitable diameter of cable without changing or altering track turns or drives.

Furthermore, pairs of trolley wheels having more than one diameter can be attached to the power chain. Thus, non-load bearing trolleys (idler trolleys) with smaller wheels and load-bearing trolleys with larger wheels can be employed in the same conveyor system. This permits economy of manufacture and also permits larger or heavier trolleys to be installed when or where needed without installation of an entirely new set of trolleys. In addition, the manner in which the trolleys are attached to the chain allows easy removal, addition or replacement of trolleys.

Now referring to the Figures, an overhead trolley conveyor system of the present invention is indicated generally by the Numeral 1. Conveyor system 1 broadly comprises an overhead guide track, indicated generally by the Numeral 2, and a plurality of chain driven trolleys guided by and supported thereon, indicated generally by the Numeral 10.

Track 2 is an elongated member which guides and supports a plurality of chain driven trolleys which roll thereon. Track 2 of the present invention comprises a pair of angle irons 4 and 6 which are fixedly located in longitudinally parallel relationship by a plurality of strap members 8 of channel-shaped cross section with tapered legs. Angle irons 4 and 6 are longitudinally parallel and have respective, generally vertically extending walls 12 and 14 and integral, laterally inwardly extending flanges 16 and 18 upon which trolleys 10 are supported for longitudinal movement. The laterally inner edges 20 and 22 of flanges 16 and 18 are spaced from each other a distance sufficiently great to allow hanger 52 to freely extend therebetween. Flanges 16 and 18 are of sufficient lateral width to support trolley wheels 47 and 49 but of less width than that which would permit one of said wheels to extend beyond the edge 20 or 22 associated therewith while the other of said wheels is supported by the associated flange 16 or 18.

Angle irons 4 and 6 are maintained in proper fixed spaced relationship and attitude with respect to each other by means of a plurality of strap members 8 which are fixedly attached to the top portions of walls 12 and 14. Each strap 8 has a horizontal portion 24 and integral, tapered flanges 26 and 28 extending downwardly from the laterally outer ends of horizontal portion 24. As is best shown in FIGS. 2 and 3, the laterally inward surfaces 30 and 32 of downwardly extending flanges 26 and 28 are canted somewhat from the vertical with the result that walls 12 and 14 of angle irons 4 and 6 are likewise canted from the vertical when laterally outwardly facing surfaces 34 and 36 thereof are placed in abutting relationship to laterally inwardly facing surfaces 30 and 32 and angle irons 4 and 6 are fixedly attached to strap 8 by means of welds 38, 39, 40 and 41 or other suitable means. As flange 16 extends at a right angle to wall 12 and flange 18 extends at a right angle to flange 14, upwardly facing surfaces 42 and 44 of flanges 16 and 18 are, as a result, of the particular components employed herein, not horizontally disposed but are angled from the horizontal such that laterally inner portions thereof are disposed lower than the laterally outer portions thereof.

Each trolley 10 comprises a pair of load supporting wheels 47 and 49 having tapered circumferences 46 and 48 and connected to an axle 50 which extends therebetween. A single grease fitting 51 communicates with the hollow interior of axle 50 to provide easy servicing of trolley 10. Fixedly attached to axle 50 as by welding is hanger 52 which extends downwardly therefrom and has a horizontally disposed portion 54 which is attached by welds 55 and 57 or suitable means to a sidelink 56 of a conventional conveyor chain such as a keystone rivetless chain shown as comprising sidelinks 56 and 60 connected by centerlinks 58. Suitable chains for use in the present invention include 2 inch to 6 inch pitch chain or even flexible cable.

It will be appreciated by those skilled in the art that the arrangement of the present invention provides a self-centering feature by employing trolley wheels 47 and 49 having tapered circumferences 46 and 48 which roll along upwardly facing surfaces 42 and 44 of flanges 16 and 18 of angle irons 4 and 6. Thus, should a trolley 10 be moved laterally by an external force, the trolley 47 or 49 in the direction of lateral movement will be disposed on a higher plane than the other of wheels 47 and 49 and the force of gravity will tend to urge the trolley back to a laterally central location where both wheels 47 and 49 lie along a horizontal plane. In addition, it will be appreciated that the structure of the present invention avoids the problem of spreading apart of half trolleys common in the art.

Now referring to FIGS. 3 and 4 an alternative embodiment of the present invention is shown wherein an alternative hanger 62 is employed. It is contemplated in this embodiment that angle irons 4 and 6 and straps 8 will be of the same construction as that of the embodiment of FIGS. 1 and 2, however, as shown in FIG. 3, welds 38, 39, 40 and 41 have been omitted to illustrate that straps 8 can be attached to angle irons 4 and 6 by alternative methods such as a suitable adhesive.

Hanger 62 comprises a strap member having an upper portion 64 which is reversely bent about axle 50 to form an upper portion of generally U-shaped cross section as best shown in FIG. 4. The lower portion of hanger 62 has a pair of integral legs 72 and 74 which extend generally downwardly and outwardly from each other to clampingly grip a central portion 80 located in the interior 82 of sidelink 56 by means of end portions 76 and 78 which are inwardly turned toward each other. The clamping force between end portion 76 and 78 of hanger 62 is provided by bolt 66 which extends through the middle portion of hanger 62 and has a threaded end portion 68 with a nut 70 threadably tightened thereon. Of course, while the trolleys are shown attached to the side links of the conveyor chain 11, they can be detached from the side links and attached to the center links of the chain 11.

Figure 5:
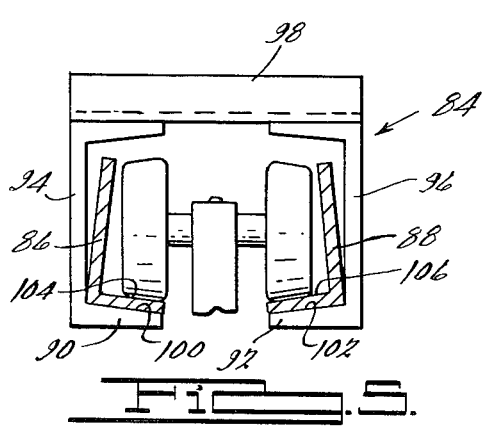
FIG. 5 is a cross sectional view similar to that of FIG. 2 and showing an alternative embodiment of a guide track of the present invention.
Figure 6:
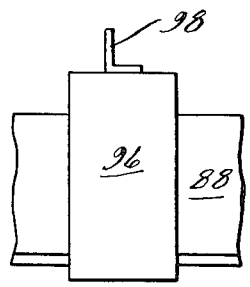
FIG. 6 is a side elevation, broken away, of the embodiment of FIG. 5.

Now referring to FIGS. 5 and 6, an alternative track for use in the present invention is shown, and indicated generally by the Numeral 84. Track 84 comprises a pair of angle irons 86 and 88 which are identical in shape, relationship and function to angle irons 4 and 6 previously described and which are fixedly attached to tapered flanges 90 and 92 of a plurality of spaced channel members 94 and 96 each of which is fixedly secured to cross support member 98 which can be of angle iron configuration as shown in FIG. 6. It will be appreciated that tapered flanges 90 and 92 impart inwardly declining surfaces 100 and 102 which, in turn, provide the desired angled surfaces 104 and 106 of angle irons 86 and 88 for support of the pairs of trolley wheels. Track 84 is heavier construction than previously disclosed track 2 and is adapted for heavier-duty use. Thus, the arrangement of track 2 permits use of trolleys with wheels of greater diameter, such as heavy duty, 6 inch wheels. Of course, track 84 is also suitable for use with wheels of smaller diameter.

Figure 8:
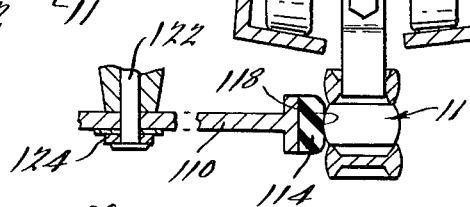
FIG. 8 is a sectional view, broken away, taken along line 8—8 in FIG. 7.

The conveyor system 1 of the present invention can employ a drive means to transport trolleys along track 2 or 84 and preferably employs a friction drive means shown in FIGS. 7 and 8, and indicated generally by the numeral 108. Drive means 108 does not employ a conventional drive sprocket but rather accomplishes a power or driving function by passing the chain or cable along a portion of circumferential surface of a power driven flat faced traction wheel 110 rotated by power means 112. Traction wheel 110 is horizontally disposed and has a circumferential layer 114 of friction coating such as a resilient half inch thick polyurethane coating. Polyurethane will allow chain or cable in contact therewith to slightly impress therein, which impression combined with the surface friction between the chain or cable and the polyurethane allows the traction wheel to drive the chain or cable without slipping. It is also expected that in case of a bind of the chain or cable, the traction wheel 110 will allow slippage to occur to protect the chain, cable or interfering structure from breaking.

As shown in FIGS. 7 and 8, track 2 is reversely bent at 116 about 180° around traction wheel 110. Enough tension is maintained on the chain 10 to provide the required frictional force between the outer surface 118 of resilient layer 114 and the inwardly facing surface that rotation of traction wheel 110 causes corresponding movement of chain 11 with substantially no slippage. Traction wheel 110 is rotatably supported by a center shaft 122 and held thereon by retaining member 124. Center shaft 122 is rotated by power means 112, which can be, e.g. an electric motor, in a conventional manner.

Figure 9:
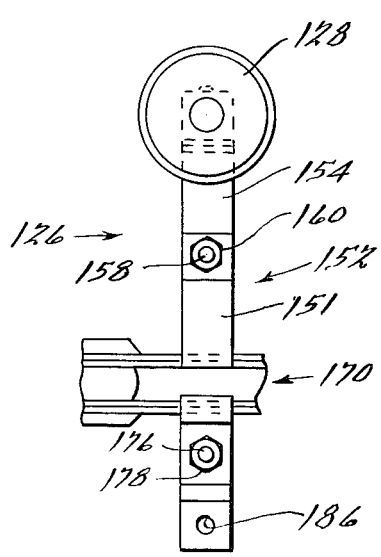
FIG. 9 is a side elevation showing another alternative hanger of the present invention.
Figure 10:
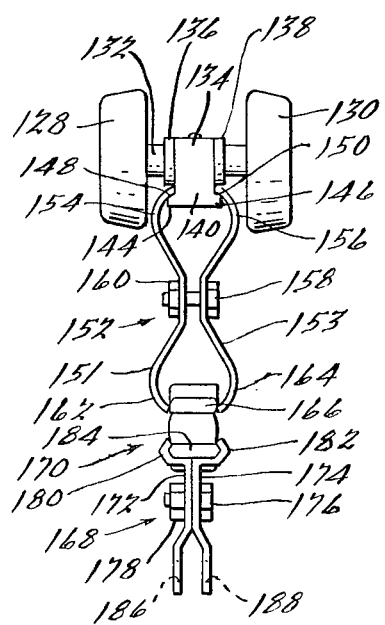
FIG. 10 is a front view taken along line 10—10 in FIG. 9.

Now referring to FIGS. 9 and 10, an alternative trolley structure suitable for use in the present invention is shown and indicated generally by the numeral 126. Trolley 126 comprises wheels 128 and 130 and axle 132 as in the previous embodiment and has a bracket 134 centrally disposed on axle 132. Bracket 134 has parallel side walls 136 and 138 which have apertures through which axle 132 extends and has front wall 140 and analogous rear wall which extend below side walls 136 and 138 and have laterally extending projections 144 and 146 which provide shoulders 148 and 150. Hanger 152 comprises two members 151 and 153 and has fingers 154 and 156 which clampingly engage bracket 134 and is retained thereon by shoulders 148 and 150. A bolt 158 and nut 160 extend through the center portion of hanger 150 to provide means for selectively clamping fingers 154 and 156 and, in addition, fingers 162 and 164 which are adapted to clampingly engage a chain link 166 in a manner analogous to the embodiment shown in FIG. 4. A load-bearing hanger 168 is disposed generally below chain 170 and comprises a pair of clamping members 172 and 174 which are selectively engaged by threaded bolt 176 which extends through aligned apertures in the center of members 172 and 174 and is retained therein by nut 178. Clamping members 172 and 174 have finger portions 180 and 182 which clampingly engage side link 184 of chain 170 in a manner analogous to fingers 154 and 156 of hanger 152. Apertures 186 and 188 are provided in the lower portions of clamping members 172 and 174 to receive a hook or bolt or other means for attaching the load to be carried thereto.

It will be appreciated that the specific forms of the present invention disclosed herein are well calculated to achieve the objects of the present invention. Thus, the embodiments of the present invention are fabricated of readily available angle iron and channel iron and can be assembled in an economical and practical manner. In addition, it will be appreciated that the amount of head space required by the present conveyor system is minimized. In addition, the construction of the present conveyor system offers a self-centering feature and an arrangement wherein the trolleys have no spreading problem and are resistant to derailing. Thus, the tapered circumference of the wheels are employed so that downwardly directed forces exerted on the trolley will tend to urge the wheels inwardly toward each other rather than outwardly in a spreading direction. Conventional trolley brackets tend to do just the opposite. Furthermore, the arrangement of the present invention minimizes the length of hangers and hence, reduces the chances of a hanger becoming entangled during use. Still further, the present invention provides a flexible system allowing use of trolleys having different diameter wheels and easy replacement of trolleys.

While specific forms of the present invention have been disclosed and described herein, it is to be understood that the present invention may be modified. For example, the present invention is useful not only in combination with a keystone rivetless chain as shown in the figures, but also with cable or any other conventional conveyor chain. Thus, it is to be understood that the present invention may be varied within the scope of the appended claims without departing from the spirit thereof.

What is claimed is:

1. An overhead trolley conveyor system comprising an overhead track and a plurality of trolleys, adjacent trolleys being connected by a flexible, inextensible member, said track comprising a pair of longitudinally extending, parallel angle irons and a plurality of longitudinally spaced strap members each of said angle irons having an inwardly extending flange and an upwardly extending wall, each of said strap members having a channel-shaped cross section with a pair of downwardly extending legs, each of said legs having a laterally inwardly facing surface canted from the vertical such that the lower portion thereof lies laterally outwardly from the upper portion thereof, said surface of one of said legs being fixedly attached to a portion of the laterally outer side of one of said walls, and said surface of the other of said legs being attached to a portion of the laterally outer side of the other of said walls, and each of said trolleys comprising a pair of tapered wheels interconnected by an axle and having a hanger attached thereto, each of said wheels being adapted to roll longitudinally along the upper surface of one said flange, each of said pair of angle irons being spaced a distance from the other sufficient to allow free extension of said hanger therebetween but insufficient to allow one of said pair of tapered wheels to extend therebetween before the other of said pair of tapered wheels contacts the inwardly facing surface of one of said vertically extending walls of one of said angle irons.

2. An overhead trolley conveyor system as recited in claim 1 wherein said flexible, inextensible member is a chain.

3. An overhead trolley conveyor system as recited in claim 2 wherein said hanger comprises a strap member and clamping means, said strap member having a pair of generally downwardly extending leg portions and an integral portion connecting the upper portions of said legs and reversely bent over said axle, and said leg portions are adapted to clampingly engage said chain upon engagement of said clamping means.

4. An overhead trolley conveyor system as recited in claim 3 wherein said clamping means comprises a threaded bolt which extends through aligned apertures in each of said legs and a nut adapted to threadably engage said legs cooperates with the other to clampingly engage a portion of a sidelink of said chain therebetween.

5. An overhead trolley conveyor system as recited in claim 1 including, in addition, a traction wheel having a circumferentially disposed resilient layer adapted to engage sequential portions of said flexible inextensible member and cause movement thereof.

6. An overhead trolley conveyor system as recited in claim 5 wherein said traction wheel is rotatably supported by a centrally disposed shaft which is connected to a drive means and wherein the circumference of said traction wheel comprises a layer of polyurethane.

7. An overhead trolley conveyor as recited in claim 2 wherein said trolley comprises a pair of tapered wheels connected by an axle, a bracket attached to said axle, and a hanger clampingly retained on said bracket and clampingly engaging a link of said chain.

8. An overhead trolley conveyor as recited in claim 7 wherein a load carrying hanger is clampingly attached to said link of said chain and extends below said chain.

9. An overhead trolley conveyor system comprising an overhead track and a plurality of interconnected trolleys, said track comprising a pair of longitudinally parallel angle irons, each having a laterally inwardly extending flange and vertically extending wall, a plurality of longitudinally spaced strap members having channel-shaped cross section, each of said strap members having a pair of generally laterally inwardly extending legs, one of said legs being disposed below the other of said legs, the lower of said legs having an upwardly facing surface canted from the horizontal such that the laterally inner portion thereof is below the laterally outward portion thereof, each of said upwardly facing surfaces being supportedly engaged with a portion of one of said laterally, generally inwardly extending flanges of said angle irons, the top portions of said strap members being fixedly connected by a cross member, and each of said trolleys comprising a pair of tapered wheels interconnected by an axle and having a hanger attached thereto, each of said wheels being adapted to roll longitudinally along the upper surface of one of said flanges of one of said angle irons.

* * * * *

UNITED STATES PATENT AND TRADEMARK OFFICE
CERTIFICATE OF CORRECTION

PATENT NO. : 4,267,778
DATED : May 19, 1981
INVENTOR(S) : William V. Wilkie

It is certified that error appears in the above—identified patent and that said Letters Patent is hereby corrected as shown below:

In Claim 7, line 1, the number "2" should be --6--.

Signed and Sealed this

Eleventh Day of August 1981

[SEAL]

Attest:

Attesting Officer

GERALD J. MOSSINGHOFF
Commissioner of Patents and Trademarks